(12) United States Patent
Park

(10) Patent No.: US 10,192,082 B2
(45) Date of Patent: Jan. 29, 2019

(54) TAG SYSTEM FOR PROVIDING STATUS DATA OF A DEVICE

(71) Applicant: palmCLOUD Co., Ltd., Pohang-si, Gyeongsangbuk-do (KR)

(72) Inventor: Young Suck Park, Pohang-si (KR)

(73) Assignee: palmCLOUD Co., Ltd., Pohang-si (KR)

( * ) Notice: Subject to any disclaimer, the term of this patent is extended or adjusted under 35 U.S.C. 154(b) by 7 days.

(21) Appl. No.: 15/849,646

(22) Filed: Dec. 20, 2017

(65) Prior Publication Data

US 2018/0307874 A1     Oct. 25, 2018

(30) Foreign Application Priority Data

Apr. 25, 2017 (KR) ........................ 10-2017-0052827

(51) Int. Cl.
*G06K 7/10* (2006.01)
*G06K 19/07* (2006.01)

(52) U.S. Cl.
CPC ..... *G06K 7/10297* (2013.01); *G06K 7/10316* (2013.01); *G06K 19/0723* (2013.01)

(58) Field of Classification Search
CPC .......... G06K 7/10297; G06K 7/10316; G06K 19/0723
See application file for complete search history.

(56) References Cited

U.S. PATENT DOCUMENTS

| 2002/0134836 A1* | 9/2002 | Cash ..................... G06Q 10/08 235/385 |
| 2003/0095032 A1* | 5/2003 | Hoshino ........... G06F 17/30876 340/5.92 |
| 2006/0168644 A1* | 7/2006 | Richter ............. G06F 17/30876 726/2 |
| 2007/0158402 A1* | 7/2007 | Sonetaka .......... H04M 1/72525 235/375 |
| 2009/0229177 A1* | 9/2009 | Hyde ....................... A01G 7/00 47/1.7 |

(Continued)

FOREIGN PATENT DOCUMENTS

| KR | 10-0702850 B1 | 4/2007 |
| KR | 10-1683658 B1 | 12/2016 |

*Primary Examiner* — Daniel I Walsh
(74) *Attorney, Agent, or Firm* — Novick, Kim & Lee, PLLC; Sang Ho Lee

(57) ABSTRACT

Provided is a tag system for providing status data of a device, which provides status data of a device using a uniform resource locator (URL) through a tag to a terminal and allows the terminal to provide the status data of a device in the form of a web browser in conjunction with a web server. According to the present invention, data of a device can be immediately checked through a mobile terminal without installing a dedicated application. Particularly, in the case of a device lacking a network or monitoring function, such a device can operate as an Internet of things (IoT) device via a terminal by applying a tag according to the present invention. Through application of the present invention, the remaining amount of a replaceable battery used for a drone, a camera, or the like or an auxiliary battery used for a smartphone can be measured, and a status of a control device installed in a production facility lacking a monitoring system can be checked on the spot.

13 Claims, 4 Drawing Sheets

(56) References Cited

U.S. PATENT DOCUMENTS

| | | | |
|---|---|---|---|
| 2011/0221575 A1* | 9/2011 | Mincey | G06K 19/0716 |
| | | | 340/10.3 |
| 2013/0215467 A1* | 8/2013 | Fein | G06F 3/1204 |
| | | | 358/1.15 |
| 2014/0181256 A1* | 6/2014 | Trifa | H04L 67/2814 |
| | | | 709/218 |
| 2015/0012976 A1* | 1/2015 | Milder | H04L 63/126 |
| | | | 726/4 |
| 2015/0220955 A1* | 8/2015 | Hintze | G06Q 30/0214 |
| | | | 705/14.16 |
| 2016/0171439 A1* | 6/2016 | Ladden | G06Q 10/0832 |
| | | | 705/340 |
| 2016/0171486 A1* | 6/2016 | Wagner | G06Q 20/12 |
| | | | 705/39 |
| 2016/0227071 A1* | 8/2016 | Asakura | H04N 1/32496 |
| 2016/0261769 A1* | 9/2016 | Yamada | H04W 76/14 |
| 2017/0280688 A1* | 10/2017 | Deliou | H01Q 5/30 |
| 2018/0160255 A1* | 6/2018 | Park | H04L 67/02 |

\* cited by examiner

TAG SYSTEM FOR PROVIDING STATUS DATA OF A DEVICE

CROSS-REFERENCE TO RELATED APPLICATION

This application claims priority to and the benefit of Korean Patent Application No. 2017-0052827, filed on Apr. 25, 2017, the disclosure of which is incorporated herein by reference in its entirety.

BACKGROUND

1. Field of the Invention

The present invention relates to a tag system for providing status data of a device, which provides status data of a device using a uniform resource locator (URL) through a tag to a terminal and allows the terminal to provide the status data of the device in the form of a web browser in conjunction with a web server.

2. Discussion of Related Art

A category of radio frequency identification (RFID) includes non-contact near-field communication (NFC) which includes NFC (13.56 MHz), TranferJet (4.48 GHz), and Zing (60 GHz). Among these technologies, a standard that can be used for various kinds of terminals, such as smart phones and handheld devices, is referred to as an NFC tag.

Conventionally, in order to providing status data of a device through an NFC tag, a method of collecting (reading) corresponding data through a dedicated application after the application is installed is used.

Thus, there is a difficulty in that a series of processes, such as application searching, downloading, installing, user registering, setting, pairing, and the like, need to be performed in order to receive status data of a device.

Particularly, in the case of a one-time use service which is not used continuously, a service avoidance phenomenon in which a user refuses to receive the service through an application is the biggest issue for mobile application services.

As a related art, Korean Registered Patent Publication No. 10-1683658 discloses a method of collecting status data of a device and a device status data collection kit used for the method.

The above related art is directed to a method of collecting status data of each of a number of devices to be managed. The method includes: dividing the number of devices to be managed into a direct collection group of devices whose status data of a device is collected by a portable device status detection unit which performs a detecting operation on each of the devices, and an indirect collection group of devices whose status data of a device is collected by communication between each of the devices and a stationary unit disposed to be capable of detecting the status data of a device of each of the devices; further dividing the managed devices belonging in the indirect collection group into a first indirect collection group in which the status data of a device is collected by communication between the stationary unit and a central control apparatus and a second indirect collection group in which the status data of a device is collected by communication between the stationary unit and the portable unit; setting a frequency of collecting the status data of a device for each of the number of devices to be managed; selecting devices to be included in the direct collection group from devices having the same set collection frequency; and selecting all or some of devices having collection frequencies different from that of the devices selected for the direct collection group as devices to be included in the first indirect collection group. This related art does not directly describe a terminal for data processing. However, in Korean Registered Patent Publication No. 10-0702850 disclosing an environmental condition recognition system using a tag, which is rather different from a technology for collecting and providing status data of a device, it is still stated that an application is typically used along with a tag and a reader to process tag data.

Accordingly, there is a need for a technology capable of providing data without installation of an application by bringing a mobile terminal, such as a smart phone, close to a device so that the mobile terminal obtains required data.
Related Art(s)

SUMMARY OF THE INVENTION

One objective of the present invention is to provide a tag system for providing status data of a device, which provides status data of a device using a uniform resource locator (URL) through a tag to a terminal, and allows the terminal to provide the status data of the device in the form of a web browser in conjunction with a web server.

Another objective of the present invention is to provide a tag system for providing status data of a device which resolves troubles caused by a dedicated application being installed and problems of stagnation in use of a service and service user attrition when a terminal, such as a smartphone or a tablet computer, is used for a conventional method of collecting status data of a device.

Another objective of the present invention is to provide a tag system for providing status data of a device which allows modified data to be provided to a server by editing URL data to overcome a limitation of an existing tag that provides stored URL data intact without modification.

In one general aspect, there is provided a tag system for providing status data of a device, including: a device (100) comprising a tag; a terminal (200) comprising a reader capable of tagging the tag of the device (100) and configured to receive data, transmit the data to a server (300), and output a web page on the basis of data received from the server (300); and the server (300) configured to construct the web page after organizing the data by determining security setting and a user on the basis of the data received from the terminal (200), and transmit the web page to the terminal (200).

In one example, the device (100) may include a status data storage configured to store status data of the device (100), and the tag (120) configured to collect the status data of the status data storage (110) and reconfigure URL data on the basis of the status data.

In another example, the device (100) may include a status data measurer configured to measure status data of the device (100) upon a request of the tag (120), and the tag (120) configured to collect the status data measured by the status data measurer and reconfigure URL data on the basis of the collected status data.

In this case, the tag (120) may include a URL storage configured to store URL data used to provide the status data of the device (100) to the terminal (200), an identification (ID) data storage configured to store unique ID data of the device (100), a status data collector configured to collect the status data from the status data storage (110), an antenna configured to transmit and receive data between the reader of the terminal (200) and the tag of the device (100), and a processor configured to collect the URL data, the ID data, and the status data to reconfigure the URL data to be transmitted to the terminal (200) and control the antenna.

In addition, the terminal (200) may include the reader configured to tag the tag of the device (100), and a web browser configured to allow the web page to be displayed on a screen of the terminal (200).

The server (300) may include a web generator (310) configured to generate the web page on the basis of data reconfigured in the device (100) and transmit the web page to the terminal (200).

In addition, the server (300) may include a database (320) configured to store device data, security data, and user data and the device data may include basic data and ID data of the device (100).

In this case, the server (300) may include a security setter (330) configured to set security of the device 100 and a security determiner (340) configured to determine whether security is set for the device 100 on the basis of the security data stored in the database (320) and the ID data of the device 100 included in reconfigured URL data when the reconfigured URL data is received from the terminal (200).

The server (300) may include a user register (350) configured to register the user and a user registration determiner (360) configured to determine whether a user of the terminal (200) which requests that status data of the corresponding device (100) is a registered user when the security determiner (340) determines that the security is set for the device (100).

The server (300) may include a data organizer (370) configured to organize user data and basic data including status data of the device (100) to construct the web page.

In operation processes of the tag system for providing status data of a device as described above, when the terminal (200) tags the tag of the device (100) through the reader (S1), the device (100) may collect status data of the terminal (200) (S2), collect ID data (S3) of the terminal (200), reconfigure collected URL to include status data and ID data of a target device, and transmit the reconfigured URL to the terminal (200) (S4), thereafter, when the terminal (200) accesses the server (300) and transmits the reconfigured data to the server (300), the server (300) may extract the URL (S6) and determine whether security is set for the corresponding target device (100) (S7), and when it is determined that the security is set, the sever (300) may determine whether the user is a registered user (S8), and, when the user is a registered user, the server (300) may organize the user data (S9) and the device data (S10) to construct the web page configured to display the status data of the device (100) (S11), and then transmit the constructed web page to the terminal (200) which displays the web page (S12).

When it is determined that the security is not set for the device (100), the server (300) may organize the device data.

In addition, when it is determined that the user is not a registered user, the server (300) may retrieve and collect user data stored in the database (320) (S8-1) and then organize the user data (S9).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
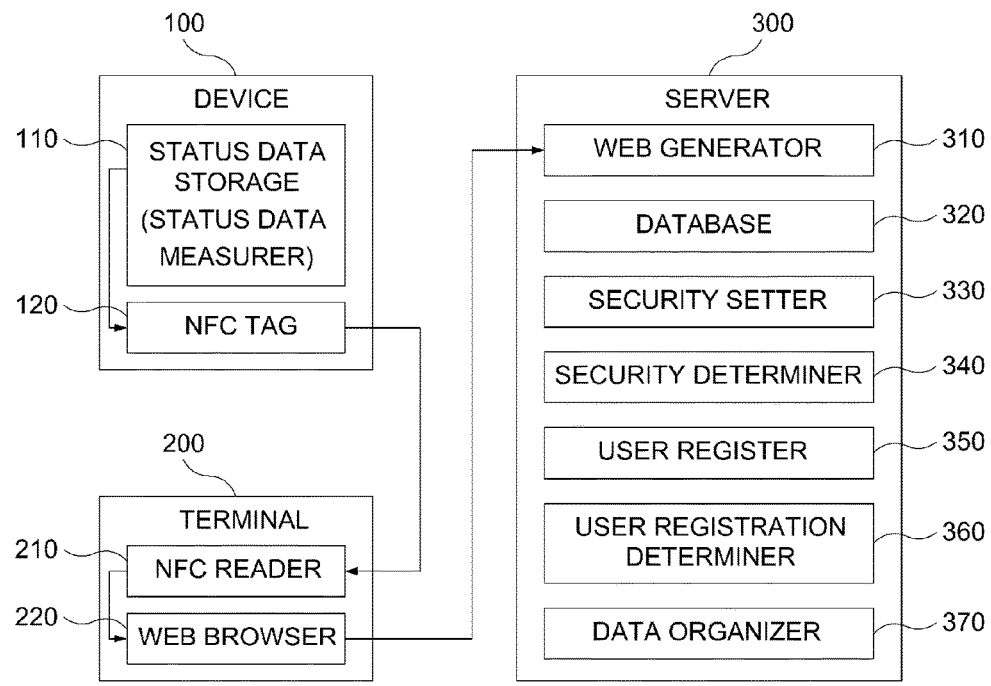
FIG. 1 is a diagram schematically illustrating a tag system for providing status data of a device according to the present invention.

It should be understood that terms or words used in the specification and the appended claims are not to be construed as being limited to commonly employed meanings or dictionary definitions, but are to be interpreted on the basis of meanings and concepts corresponding to the technical idea of the present invention based on the principle that the inventors are allowed to define terms appropriately for the best explanation of their invention.

Accordingly, the embodiments described in the present specification and the configuration shown in the drawings are nothing but one preferred embodiment of the present invention that does not cover all of the technical ideas of the present invention. Thus, it should be understood that various changes and modifications may be made at the time of filing the present application.

Hereinafter, prior to describing the present invention with reference to the accompanying drawings, it should be noted that content not required to reveal the gist of the present invention, i.e., well-known configurations that may be obviously added by those skilled in the art, will be neither illustrated nor described in detail.

The present invention relates to a tag system for providing status data of a device, which provides status data of a device using a uniform resource locator (URL) through a tag to a terminal and allows the terminal to provide the status data of the device in the form of a web browser in conjunction with a web server.

Accordingly, the present invention does not require a separate tester for monitoring various pieces of status data of a device, and can easily collect status data of a device through a terminal. At the same time, according to the present invention, (a) it is possible to easily specifically check the remaining amount of an auxiliary battery or a replaceable battery used for a camera, a drone, or the like before the battery is mounted, (b) in the case of a small-sized device to which a display for displaying status data cannot be mounted, the status data can be provided by attaching a micro tag to the device, (c) manufacturing costs can be significantly reduced since a separate monitoring device for monitoring status data is not required, (d) the status data of the device can be collected using power supplied from a proximity tag even when the device does not include a separate power source, (e) it is possible to prevent a product design compromise due to attachment of an interface for displaying status data, such as an indicator or a display, and (f) since an application for checking the status data is not installed separately, it is possible to alleviate complexity due to a configuration of the application and it is also possible to immediately provide the status data, thereby solving a system congestion problem due to the provision.

Particularly, since the present invention does not use an application, it is possible to overcome an avoidance tendency of a user who does not install a one-time use application. And it is possible to reduce energy consumption as well.

The present invention will be described in detail through the accompanying drawings. FIG. 1 is a diagram schematically illustrating a tag system for providing status data of a device according to the present invention.

The tag system for providing status data of a device according to the present invention shown in FIG. 1 mainly provides a device 100, a terminal 200, and a server 300.

The device 100 refers to all device units that provide status data, and includes a status data storage 110 and a near-field communication (NFC) tag 120, as shown in FIG. 1.

The status data storage 110 is referred to for easy understanding of the present invention, and may serve a function of a storage unit, a measurement unit, or a processor, which can store all pieces of status data of the device 100.

In view of the technical features of the present invention, the device 100 is not limited to a specific type of device and may be configured to measure and store its own status data in advance. However, when the NFC tag 120 collects the status data of the device 100, the device 100 may not store the status data in advance, but may control a measurement unit to measure the status data of the device 100. In this case, the status data storage 110 may serve a function of the measurement unit.

Thus, the status data storage 110 may be construed as a status data storage or a status measurer according to an operational function thereof.

That is, for example, in the case of the status data storage, when the NFC tag 120 requests that the status data of the device 100 be collected, the status data storage stores the status data of the corresponding device in advance at predetermined intervals so that the stored status data may be collected by a status data collector when the status data collector requests the collection. In another example, in the case of the status measurer, when the status data collector of the NFC tag 120 requests that the status data of the device 100 be collected, the status measurer measures the status data of the corresponding device so that the measured status data may be collected by the status data collector.

The NFC tag 120 is attached to the device 100 and collects the status data of the device 100 stored in the status data storage 110.

The NFC tag 120 will be described in detail with reference to FIG. 2.

Figure 2:
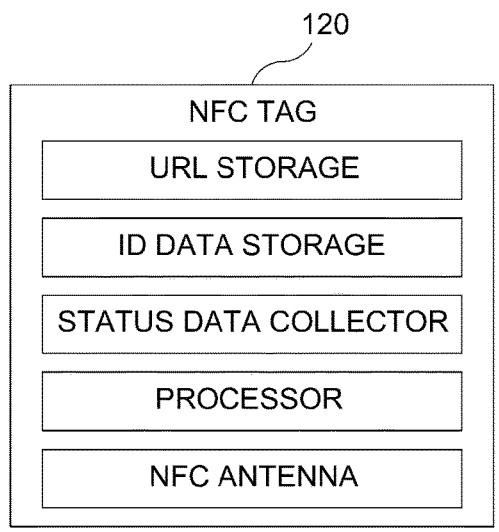
FIG. 2 is a diagram schematically illustrating a configuration of a near-field communication (NFC) tag in the tag system for providing status data of a device according to the present invention.

FIG. 2 is a diagram schematically illustrating a configuration of an NFC tag in the tag system for providing status data of a device according to the present invention.

Referring to FIG. 2, the NFC tag 120 includes a URL storage, an identification (ID) data storage, a status data collector, a processor, and an NFC antenna.

URL data used to provide status data of a corresponding device 100 to the terminal 200 is stored in the URL storage, and a unique product ID (PID) of the device 100 is stored in the ID data storage.

The status data collector is configured to receive and collect status data of the device from the status data storage 110, and the processor is configured to collect URL data, ID data, and status data, reconfigure the collected data into data to be transmitted to the terminal 200, and control the NFC antenna.

The NFC antenna enables data transmission/reception between the NFC reader and a tag. In the specification, NFC is described for a tag, a reader, and an antenna. However, this is merely for easy understanding of the present invention, and it should be understood that any local wireless communication technology (e.g., Wi-Fi, radio frequency identification (RFID), and the like) which may be recognized through the terminal may substitute for the NFC.

The terminal 200 receives the data reconfigured through the NFC tag 120 of the device 100, transmits the data to the server 300, which will be described below, receives web page data from the server 300, and displays the received web page data.

To this end, as shown in FIG. 1, the terminal 200 may include an NFC reader 210 and a web-browser 220. In this case, the NFC reader 210 receives the reconfigured data by tagging the NFC tag 120, and the web-browser 220 assists in a display of a web page on a screen of the terminal 200.

The server 300 receives the reconfigured data from the terminal 200, which received the reconfigured data from the NFC tag 120 of the device 100, performs predetermined control to construct a web page, and transmits the web page to the terminal 200.

To this end, the server 300 includes a web generator 310, a database 320, a security setter 330, a security determiner 340, a user register 350, a user registration determiner 360, and a data organizer 370.

The web generator 310 generates a web page on the basis of the reconfigured data of the device 100 and transmits the web page to the terminal 200.

Before the web page is transmitted to the terminal 200, determination of set security and user organization is performed, which will be clarified with reference to the following functions and method that will be described below.

Data used for operating the present invention is stored in the database 320, and the data used for the operation includes device data, security data, and user data.

In this case, the device data may include basic data, ID data, and an installation location of the device 100, and the security data may indicate the presence or absence of a security setting set in the device 100.

In addition, the user data may include personal data of a user, data about a terminal possessed by the user, and data about whether the user is a secured user.

The security setter 330 allows the security setting to be set in the specific device 100.

When the security determiner 340 receives the reconfigured data from the terminal 200, the security determiner 340 determines whether security is set for the corresponding device 100 on the basis of the ID data of the device 100 included in the received data.

The user register 350 allows the user to be registered as a user authenticated to use the present invention, and user data of the registered user is registered in the database 320 as the user data.

When the security determiner 340 determines that the security is set for the device 100, the user registration determiner 360 determines whether an owner (user) of the terminal 200 which requests that the status data of the device 100 be provided is a registered user.

According to another example, the security level, as well as the presence or absence of the security setting stored in the security data as described above, may be determined by being combined with the user data so that the security level is set in the device 100 through the security setter 330, and thus the user registration determiner 360 may determine whether the user of the terminal 200 requesting the status data of the corresponding device 100 matches the security level of the corresponding device 100.

According to another example, the extent to which the status data to be provided is exposed may be set to be different according to a level of the security setting.

In a case in which the server 300 constructs a web page, the data organizer 370 organizes the user data, the status data of the device 100, and basic data such that a web page is constructed for the status data of the device 100.

According to another design condition, a security function may be enhanced by utilizing functions provided in the terminal 200.

For example, in the event of loss or theft of the terminal 200, the status data may be provided to a person who is not authorized to be provided with the status data even when security is set.

In order to prevent such an exposure of status data, according to the present invention, the user data may further include predetermined recognition data so that the status data of the device 100 which is set in the security setting may be provided when a user to be determined matches the recognition data of the user data.

In this case, the recognition data may be data about iris recognition, fingerprint recognition, and/or password recognition, which are functions added to the terminal 200.

According to another design condition, the recognition data may be associated with a camera function of the terminal 200, and a photograph comparer may be provided in the server 300 or the terminal 200 so that the user registration determiner 360 may determine a user by comparing photographs.

In the case in which photographs are compared, for example, a user's face may be photographed and the photograph is compared with a pre-stored image of the user's face. In another example, photograph data obtained by capturing the device 100 at a specific angle is stored in advance, and when the user photographs the device 100 at an angle corresponding to the specific angle using the camera of the terminal 200, the user registration determiner 360 may compare pixels between the obtained photograph and pre-stored photograph data to determine whether the user is authorized to be provided with the status data.

In this case, the pixel comparison does not require a perfect match of the angles but may be made in consideration of a predetermined error range, and, security can be enhanced by the photograph obtained at the specific angle being compared with the pre-stored photograph as described above because, unlike a password, the photograph cannot be easily shared with other users. In addition, complexity involved in fingerprint or iris recognition is resolved. Since fingerprint or iris recognition technology is applied only to a specific device, use thereof is limited. However, since all terminals are equipped with a camera function, limitations in use can be overcome and security can be enhanced by the above-described configuration.

The above-described functions may be selectively provided to a user through a mode setting. To do so, a mode setter may be further included in the terminal 200.

Figure 5:
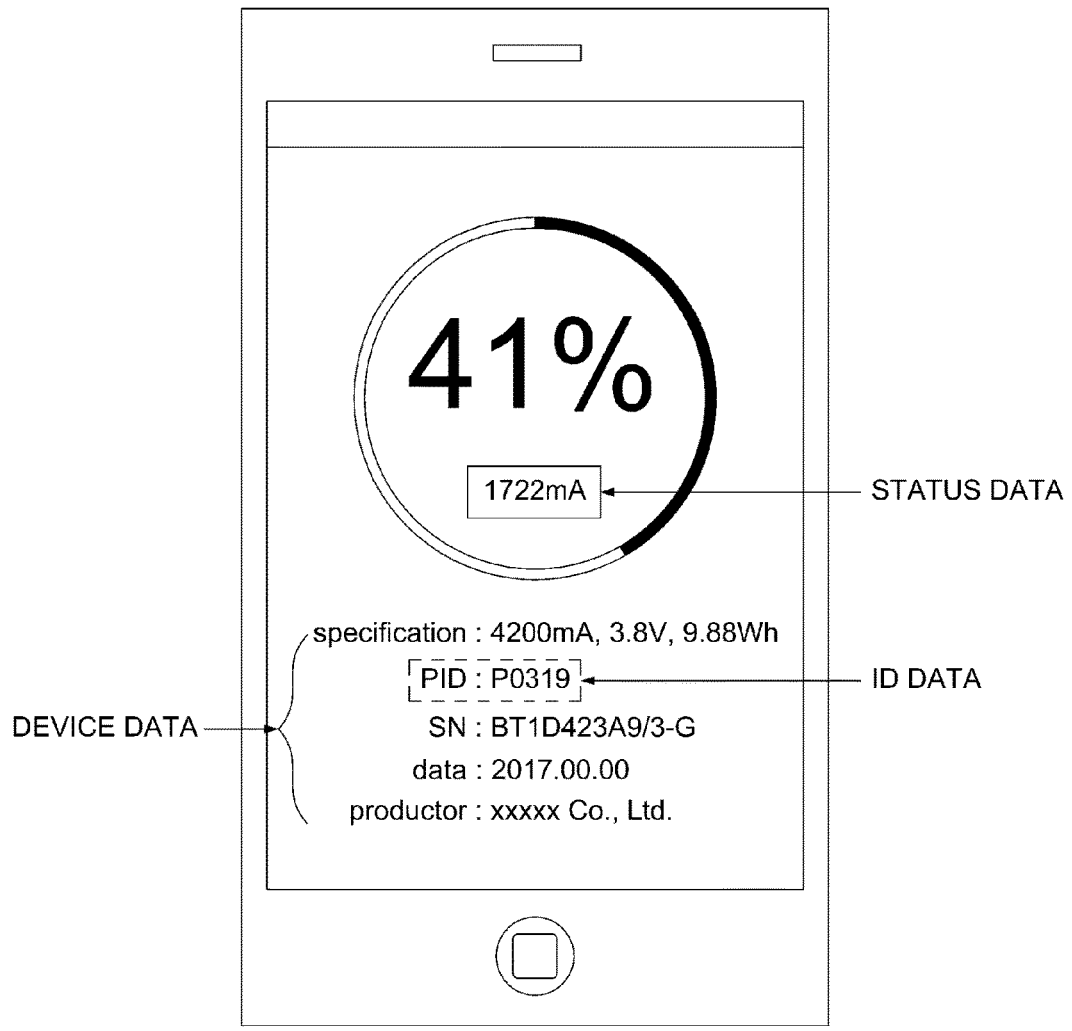

Meanwhile, for an example of data displayed on a screen of the terminal 200 through the data organizer 370 refer to FIG. 5, and data may be output to the screen of the terminal 200 on the basis of the data organized as shown in FIG. 5.

Figure 4:
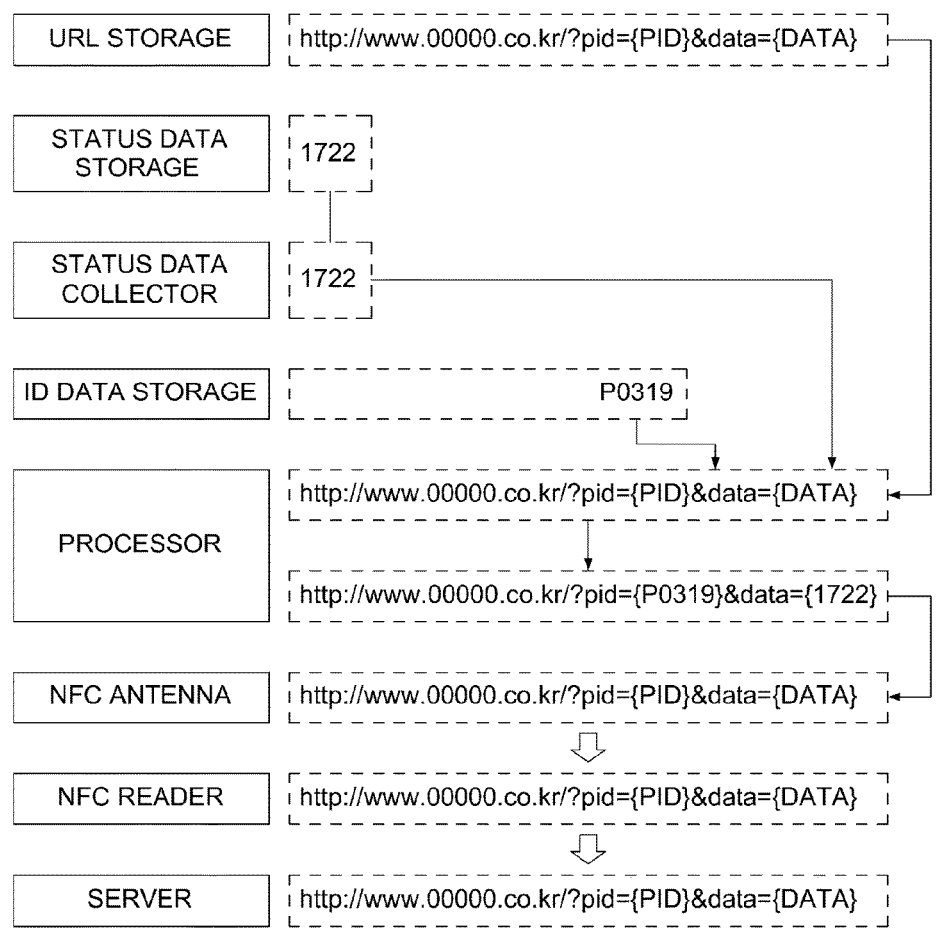
FIGS. 4 and 5 are diagrams illustrating an example of a data flow and an example of a screen output in the tag system for providing status data of a device according to the present invention.

FIGS. 4 and 5 are diagrams illustrating an example of a data flow and an example of a screen output in the tag system for providing status data of a device according to the present invention.

In particular, referring to FIG. 4, when a URL is reconfigured through the processor of the NFC tag 120, which receives URL data, status data, and ID data, and the URL is received by the NFC reader 210 through the NFC antenna of the NFC tag 120, the URL is transmitted to the server 300 and the above-described data processing is performed thereon.

The data processing will be described in detail with reference to a method of providing status data of a device.

A method of providing status data of a device according to the present invention will be described with reference to FIG. 3.

Figure 3:
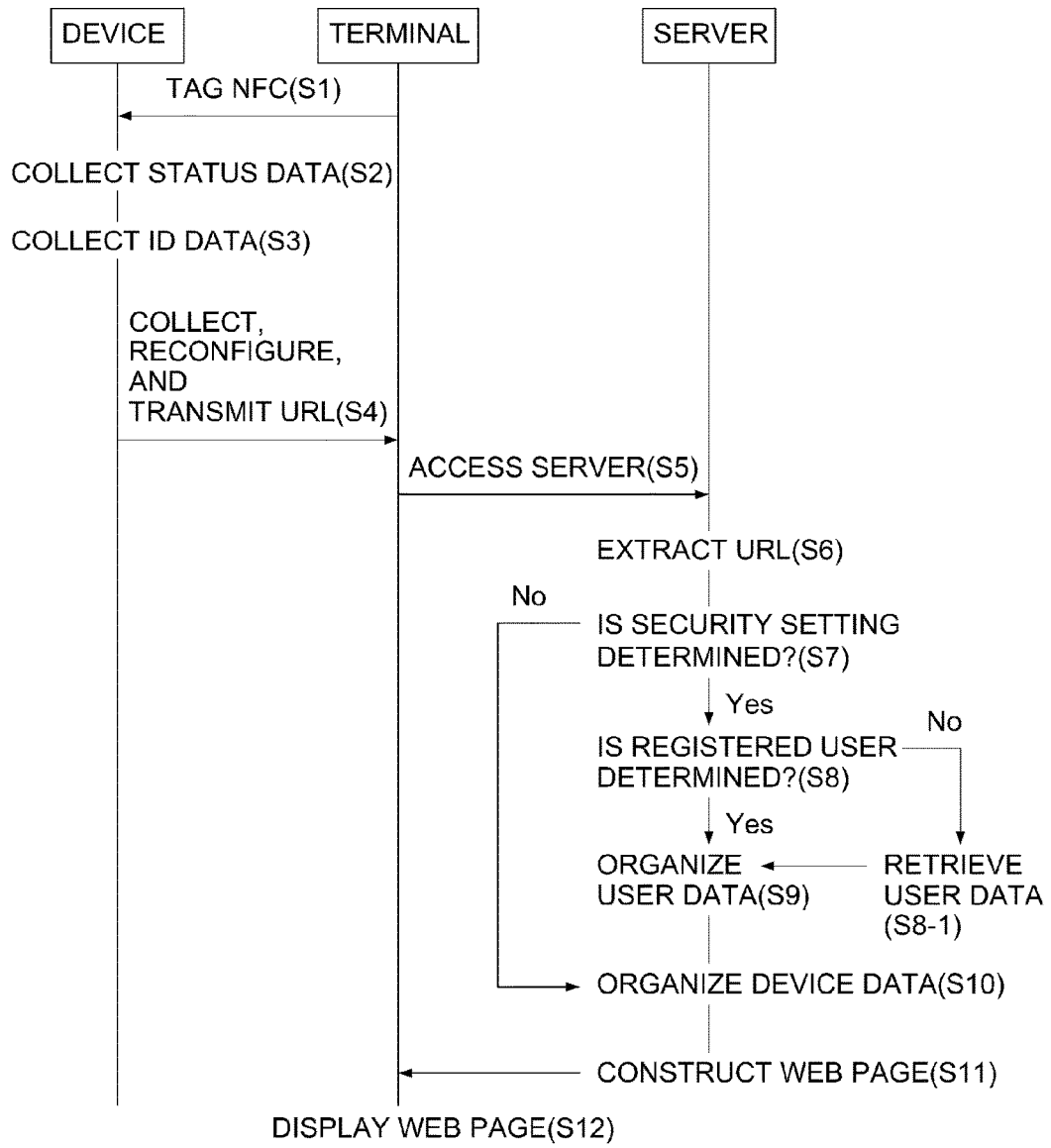
FIG. 3 is a flowchart illustrating a data processing process in the tag system for providing status data of a device according to the present invention.

FIG. 3 is a flowchart illustrating a data processing process in the tag system for providing status data of a device according to the present invention.

Referring to FIG. 3, the terminal 200 tags the NFC tag 120 of the device 100 through the NFC reader 210 (S1).

Accordingly, the device 100 collects status data of the device 100 (S2), collects ID data of the device 100 (S3), reconfigures a collected URL to include the status data and ID data of a target device, and transmits the URL to the terminal 200 (S4).

Then, when the terminal 200 accesses the server 300 and transmits reconfigured data to the server 300 (S5), the server extracts the URL (S6) and determines whether security is set for the corresponding target device 100 (S7).

When it is determined that the security is set, whether a user is a registered user is determined (S8), and when it is determined that the user is a registered user, user data is organized (S9) and device data is organized (S10) so that a web page to display the status data of the device 100 is constructed (S11).

The constructed web page is transmitted to the terminal 200 from the server 300 and is then displayed in the terminal 200 (S12).

At this time, when it is determined that the security is not set, the device data is organized (S10), and when it is determined that the user is not a registered user, user data stored in the database 320 is retrieved and collected (S8-1).

As such, after the user data is retrieved and collected, the user data is organized (S9) and the next process as described above is performed.

According to another example, the present invention configured and performed as described above may detect a loss of the device 100 and induce the user to report the loss.

For example, when the security is set for the device 100 which is tagged by the terminal 200 and it is determined that the user is not a registered user, (a) the terminal 200 is configured to output a report interface so that a person performing tagging can notify an authority (e.g., a police station or the like) by carrying out reporting.

Alternatively, (b) when the terminal 200 of an unregistered user tags the device 100, the tagging may be automatically reported to an authority. In this case, the report interface may be configured to be capable of automatic reporting.

However, in the case of (a), it may be possible to cause the report to be made as described above, but it is also possible to induce the tagger to first contact an original owner of the device 100 by displaying a contact of the owner through the interface.

This may be performed on the basis of the user data stored in the database 320.

According to the tag system for providing status data of a device according to the present invention, a separate tester for monitoring various pieces of status data of a device is not required and the status data of a device can be easily collected through a terminal. At the same time, (a) it is possible to easily check in detail the remaining amount of an auxiliary battery or a replaceable battery used for a camera, a drone, or the like before the battery is mounted, (b) in the case of a small-sized device to which a display for displaying status data cannot be mounted, the status data can be provided by attaching a micro tag to the device, (c) manufacturing costs can be significantly reduced since a separate monitoring device for monitoring the status data is not required, (d) status data of a device can be collected using power supplied from a proximity tag even when the device does not include a separate power source, (e) it is possible to prevent a compromise of a product design due to attachment of an interface for displaying status data, such as an indicator or a display, and (f) since an application for checking the status data is not separately installed, it is possible to alleviate complexity due to the configuration of the application and is also possible to immediately provide the status data, thereby solving a system congestion problem due to the provision.

Particularly, since the present invention does not use an application, it is possible to overcome an avoidance tendency of a user who does not install a one-time use application.

Meanwhile, it should be noted that the foregoing description made with reference to the accompanying drawings discloses only the essential particulars of the present invention, and various designs can be made within the scope of the present invention. Therefore, it should be apparent to those skilled in the art that the present invention is not limited to configurations shown in the drawings.

What is claimed is:

1. A tag system for providing status data of a device, comprising:
    a device comprising a near field communications (NFC) tag and a status data storage configured to store status data of the device;
    a terminal comprising a NFC reader through which the tag of the device is readable and configured to receive data, transmit the data to a server including at least uniform resource locator (URL) data, and output a web page on the basis of data received from the server; and
    the server configured to generate the web page after organizing the data by determining a security setting and a user on the basis of the data received from the terminal, and transmit the web page to the terminal,
    wherein the tag is configured to collect the status data of the status data storage and to provide reconfigured uniform resource locator (URL) data of the webpage, to the server, on the basis of changes made to the status data collected by the tag.

2. The tag system of claim 1, wherein the tag comprises:
    a URL storage configured to store URL data used to provide the status data of the device to the terminal;
    an identification (ID) data storage configured to store unique ID data of the device;
    a status data collector configured to collect the status data from the status data storage;
    an antenna configured to transmit and receive data between the reader of the terminal and the tag of the device; and
    a processor configured to collect the URL data, the ID data, and the status data to reconfigure the URL data to be transmitted to the terminal and control the antenna.

3. The tag system of claim 1, wherein the device comprises:
    a status data measurer configured to measure status data of the device upon a request of the tag; and
    the tag configured to collect the status data measured by the status data measurer and reconfigure uniform resource locator (URL) data on the basis of the collected status data.

4. The tag system of claim 3, wherein the tag comprises:
    a URL storage configured to store URL data used to provide the status data of the device to the terminal;
    an ID data storage configured to store unique ID data of the device;
    a status data collector configured to collect the status data from the status data storage;
    an antenna configured to transmit and receive data between the reader of the terminal and the tag of the device; and
    a processor configured to collect the URL data, the ID data, and the status data to reconfigure the URL data to be transmitted to the terminal and control the antenna.

5. The tag system of claim 1, wherein the terminal comprises:
    the reader configured to tag the tag of the device; and
    a web browser configured to allow the web page to be displayed on a screen of the terminal.

6. The tag system of claim 1, wherein the server comprises a web generator configured to generate the web page on the basis of data reconfigured in the device and transmit the web page to the terminal.

7. The tag system of claim 1, wherein the server comprises a database configured to store device data, security data, and user data, and the device data comprises basic data and ID data of the device.

8. The tag system of claim 7, wherein the server comprises:
    a security setter configured to set security of the device; and
    a security determiner configured to determine whether the security is set for the device on the basis of the security data stored in the database and the ID data of the device included in reconfigured URL data when the reconfigured URL data is received from the terminal.

9. The tag system of claim 8, wherein the server comprises:
    a user register configured to register the user; and
    a user registration determiner configured to determine whether a user of the terminal which requests that status data of the corresponding device be provided is a registered user when the security determiner determines that the security is set for the device.

10. The tag system of claim 1, wherein the server comprises a data organizer configured to organize user data and basic data including status data of the device to construct the web page.

11. The tag system of claim 1, wherein:
    when the terminal tags the tag of the device through the reader, the device collects status data of the terminal, collects ID data of the terminal, reconfigures collected URL data to include status data and ID data of a target device, and transmits the reconfigured URL to the terminal;
    when the terminal accesses the server and transmits the reconfigured data to the server, the server extracts the URL and determines whether security is set for the corresponding target device; and
    when it is determined that the security is set, the sever determines whether the user is a registered user, and, when the user is a registered user, the server organizes user data and device data to construct the web page configured to display the status data of the device, and then transmits the constructed web page to the terminal which displays the web page.

12. The tag system of claim 11, wherein, when it is determined that the security is not set for the device, the server organizes the device data.

13. The tag system of claim 11, wherein, when it is determined that the user is not a registered user, the server retrieves and collects user data stored in the database and then organizes the user data.

* * * * *